No. 609,524. Patented Aug. 23, 1898.
A. L. SKINNER.
FRICTION CLUTCH MECHANISM.
(Application filed Aug. 18, 1897.)
(No Model.) 2 Sheets—Sheet 2.

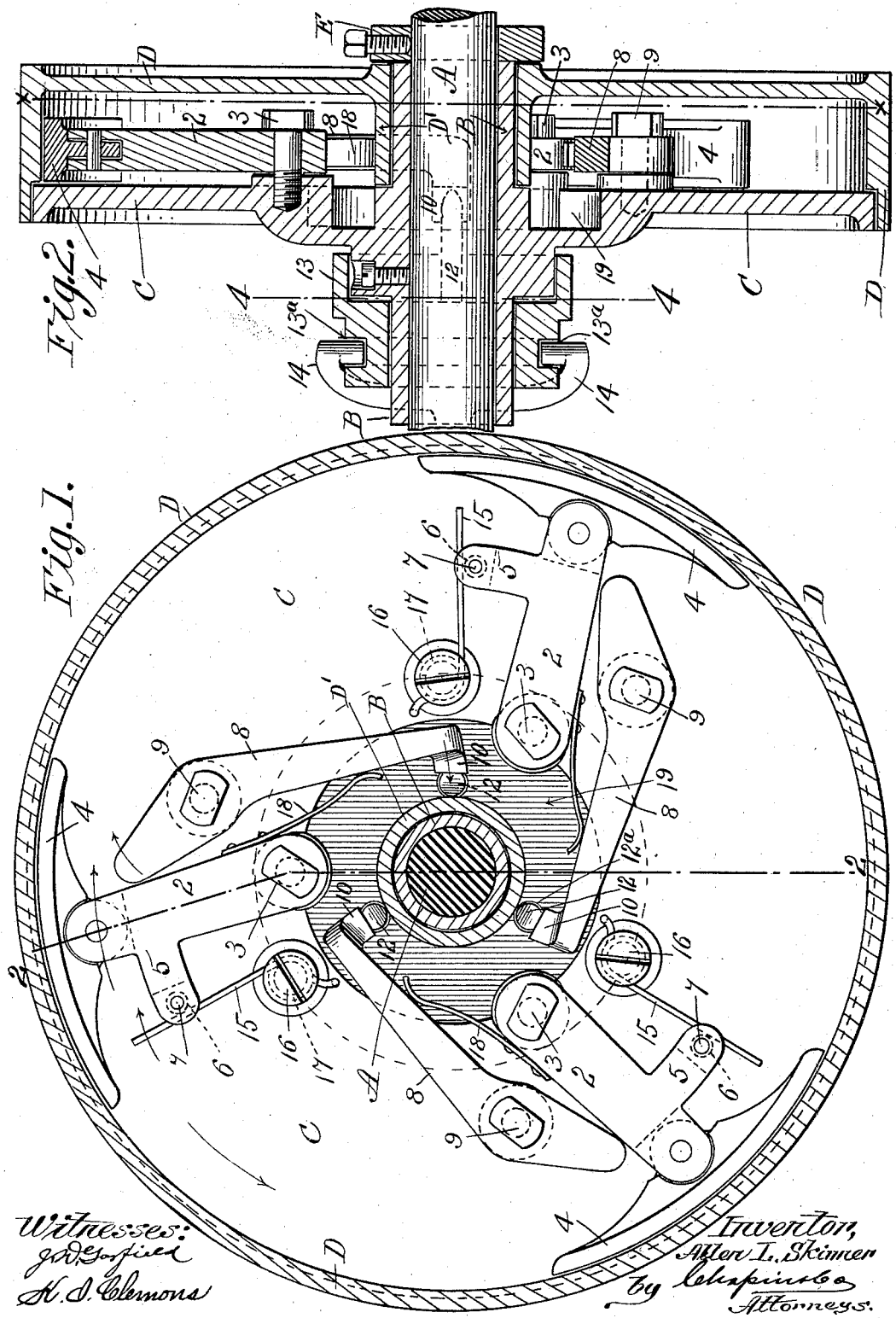

Witnesses:
Inventor:
Allen L. Skinner,
by Chapin Leo
Attorneys.

THE NORRIS PETERS CO., PHOTO-LITHO., WASHINGTON, D. C.

UNITED STATES PATENT OFFICE.

ALLEN L. SKINNER, OF SPRINGFIELD, MASSACHUSETTS, ASSIGNOR OF ONE-HALF TO ARTHUR J. SKINNER, OF SAME PLACE.

FRICTION CLUTCH MECHANISM.

SPECIFICATION forming part of Letters Patent No. 609,524, dated August 23, 1898.

Application filed August 18, 1897. Serial No. 648,628. (No model.)

*To all whom it may concern:*

Be it known that I, ALLEN L. SKINNER, a citizen of the United States of America, residing at Springfield, in the county of Hampden and State of Massachusetts, have invented new and useful Improvements in Friction Clutch Mechanism, of which the following is a specification.

This invention relates to friction clutch-pulleys, and particularly to that class wherein the actuating mechanism consists of a series of clutch-shoes operated by toggle-levers for engagement with the rim of the driven pulley; and the invention consists in the construction of a mechanism of this class, all as fully set forth in the following specification and pointed out in the claims.

Figure 3:
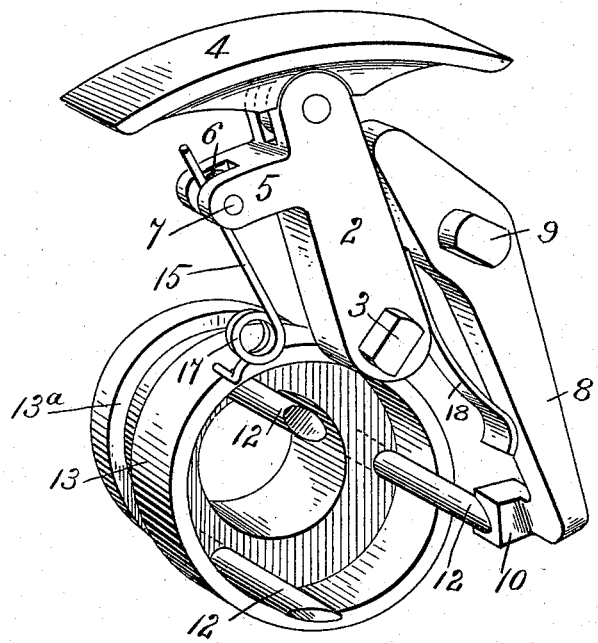
Figure 4:
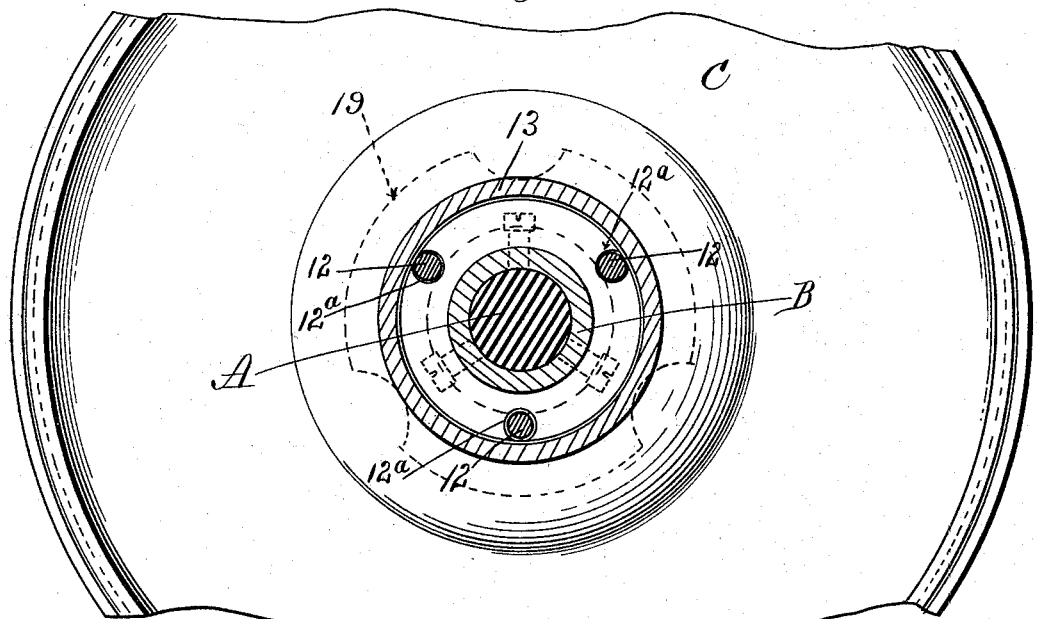

Referring to the drawings forming part of this specification, Figure 1 is a side elevation of the clutch mechanism, looking to the left, on line *x x*, Fig. 2. Fig. 2 is a vertical section on line 2 2, Fig. 1. Fig. 3 is a perspective view of one of the clutch-shoes and the operating devices therefor. Fig. 4 is a sectional view on line 4 4, Fig. 2, looking to the right.

In the drawings, A is a shaft, to which is secured in any desirable way the hub B, having on it and integral with it the flange C, whose diameter is somewhat smaller than the internal diameter of the rim of the driven pulley D, within which it is located. Said pulley is provided with a hub D', which has a bearing on the hub B, as shown in Fig. 2, and is free to revolve thereon when the clutch mechanism is disengaged therefrom. A collar E, applied to the shaft A, serves to hold said driven pulley in its proper place.

On the inner face of the flange C the toggle-levers 2 2 2 (three in number) are pivotally supported by one end by the screws 3 3 3, and on the opposite end of said toggle-levers 2 are pivoted the clutch-shoes 4 4 4. The point of attachment of said clutch-shoes to the ends of the said toggle-levers is substantially halfway between the ends of the clutch-shoes. The peripheries of the said clutch-shoes 4 are turned to a circular form, the radius of which circle is the same as the radius of the internal surface of the rim of the pulley D, against which said clutch-shoes bear when brought into contact therewith by the action of the toggle-levers 2 to drive the said pulley. Each of said toggle-levers is provided with a short arm 5, cast thereon, which projects at right angles thereto near its outer end, and the ends of said arms 5 are slotted, as shown in Fig. 3, and an antifriction-roll 6 is supported thereon on a pin 7.

The toggle-levers 2, bearing the clutch-shoes 4, are held forcibly out of engagement with the rim of the driven pulley D by the contact of one end of the levers 8 therewith, as shown, said levers 8 being pivotally supported on the flange C by the screws 9, and the opposite end of said levers are so formed as to adapt their extremities to lie near the hub D'. Said last-named extremities of the levers 8 are turned inward in a line parallel with the shaft A, and a projection 10 thereon engages with the beveled end of a pin 12, which is carried on a sliding collar 13, which has a bearing on the end of the hub B next to the flange C and on the opposite side thereof to that on which said levers are pivoted. Suitable holes 12ª are provided in the hub B, parallel with the shaft A, for the reception of the said pins 12, as shown in Fig. 4. The said pins 12 are three in number, and each one engages the end of the levers 7, as described, simultaneously, thus forcing the upper ends thereof simultaneously against the three toggle-levers 2 to swing them on their axes, disengaging the clutch-shoes 4 from their contact with the rim of the driven pulley D.

The collar 13 has an annular groove 13ª therein, with which a forked lever 14 engages, which lever may be operated by a shipper-lever of the usual construction or in any other convenient manner to slide said collar 13 on the hub B longitudinally. The movement of the said collar toward the flange C operates to disengage the clutch-shoes from the driven pulley D, as described above, and when said collar 13 is moved in the opposite direction the clutch-shoes 4 are moved into engagement with the rim of the said driven pulley by the action of a spring 15, supported on a screw 16 on the face of the flange C, as shown in Fig. 2. Said spring is made, preferably, of stiff wire, and the end thereof which engages the screw 16 is formed into a coil 17 of two or three convolutions, through which said screw passes, one end of said coil 17 being bent in toward the flange C and entering a suitable hole therein and the opposite end being formed straight and engaging the toggle-lever 2, said straight part bearing on the antifriction-roll 6, located in the arm 5 of said toggle-lever, as described.

For the purpose of always keeping the upper ends of the levers 8 in contact with the side of the toggle-levers 2, whereby all vibration of the parts is avoided, either when the driven pulley D is free or when the parts are operated to clutch said pulley, a spring 18 is riveted to each of the said toggle-levers by one end, and the opposite end thereof engages with the inner edge of the long arm of the lever 8, whereby its shorter arm is forced against the said toggle-lever 2.

It will be observed that substantially all of the rim of the driven pulley D projects to one side of the web thereof, and the flange C of the hub B, fitting inside of said rim and close to the edge thereof, forms a circular casing, within which is located all the operative parts of the clutch mechanism except the sliding collar 13, whereby the entire device is given a neat appearance.

In order that the hub D' of the driven pulley D may have as long a bearing on the hub B as possible, the flange C is made with the annular cavity 19 therein around that part of its hub which projects from the side of said flange to which the clutch mechanism is secured, and the ends of the levers 8 are so formed, as described above, as to lie within the circular cavity. (See Fig. 2 and in dotted lines in Fig. 1.)

The operation of this device is as follows: The normal position of the parts when not in use is that shown in Fig. 2—viz., the shaft A is supposed to be rotating and the driven pulley D idle. To operate the clutch to start the driven pulley D, whereby power may be transmitted from the shaft A to another shaft or machine by a belt running from said driven pulley D to said shaft or machine, the collar 13 is forcibly moved from the position thereof shown in Fig. 1 in a direction away from the flange C, whereby the pins 12 are withdrawn from under the ends of the levers 8, and the springs 15, acting on the toggle-levers 2, move them in the direction of the arrows shown on one of said levers in Fig. 1. The clutch-shoes 4 on said toggle-levers come into contact with the rim of the driven pulley D before the toggle-levers 2 attain a position which coincides with a radial line passing from the center of the shaft A through the pivoted point of the said toggle-levers, and as the said levers are moved in a direction contrary to that of the flange C, on which they are hung, it is obvious that as soon as a contact between the clutch-shoes and the rim of the driven pulley D is effected the momentum of the moving parts forces the clutch-shoes into a much more powerful contact than would be possible by means of an actuating-spring 15, such as is shown in the drawings. The main purpose of said spring is only to effect the engagement between the clutch-shoes and the rim of the driven pulley.

Having thus described my invention, what I claim, and desire to secure by Letters Patent, is—

1. A friction clutch mechanism for pulleys, comprising a shaft, a circular flange provided with a suitable hub, fixed on said shaft, a driven pulley having a bearing on the hub of said flange and turning freely thereon, toggle-levers pivotally supported by one end on said flange, clutch-shoes pivotally supported on the opposite ends of said toggle-levers for engagement with the rim of said driven pulley, which shoes are normally held out of engagement therewith; the levers 8, pivoted on said flange, one end of said levers bearing on said toggle-levers, and wedge-shaped pins having a longitudinal movement on said shaft and bearing against the inner ends of the levers 8, whereby said levers 8 are operated to permit the engagement or effect the disengagement of the said clutch-shoes and the rim of said driven pulley; and two sets of springs which bear against the two sets of levers, substantially as shown.

2. A friction clutch mechanism for pulleys comprising a circular flange secured to a driving-shaft, a driven pulley having a free turning movement on said shaft in proximity to said flange, clutch-shoes for engagement with the rim of said driven pulley, toggle-levers on which said shoes are pivotally held, pivotally supported by one end on said flange, levers 8 pivotally supported on said flange, springs on said flange bearing on said toggle-levers for moving them in a direction contrary to the direction of rotation of said driving-shaft, pins having wedge-shaped ends for engaging levers 8, which pins have a longitudinal movement on said shaft, whereby said levers are actuated to permit the engagement of the said clutch-shoes and driven pulley, and to effect the disengagement thereof, and a suitable spring between said toggle-levers and said levers 8, substantially as described.

3. In a friction-clutch, the flange C, having an annular cavity 19 around its center, the sliding collar, and the pins 12 connected thereto and passing through the flange into the annular cavity, combined with the levers 8 having inwardly-turned ends and projections formed thereon for engaging with the pins, the toggle-levers which are pivoted upon the flange, separate springs applied to the levers 2 and 8 and the shoes 4 applied at the ends of the toggle-levers, substantially as shown.

ALLEN L. SKINNER.

Witnesses:
H. A. CHAPIN,
K. I. CLEMONS.